United States Patent
Sugimoto et al.

(10) Patent No.: US 8,686,088 B2
(45) Date of Patent: Apr. 1, 2014

(54) POLYPROPYLENE RESIN COMPOSITION

(75) Inventors: Yoshio Sugimoto, Ichihara (JP); Hiroshi Suenari, Chiba (JP); Ikunori Sakai, Ichihara (JP); Frank E. Jones, Franklin, TN (US); Toru Fukada, Tipp City, OH (US)

(73) Assignee: Prime Polymer Co., Ltd., Tokyo (JP)

( * ) Notice: Subject to any disclaimer, the term of this patent is extended or adjusted under 35 U.S.C. 154(b) by 554 days.

(21) Appl. No.: 12/733,842

(22) PCT Filed: Sep. 24, 2008

(86) PCT No.: PCT/US2008/077453
§ 371 (c)(1),
(2), (4) Date: Mar. 24, 2010

(87) PCT Pub. No.: WO2009/042643
PCT Pub. Date: Apr. 2, 2009

(65) Prior Publication Data
US 2010/0210780 A1    Aug. 19, 2010

Related U.S. Application Data

(60) Provisional application No. 60/996,825, filed on Dec. 6, 2007.

(30) Foreign Application Priority Data

Sep. 26, 2007   (JP) ................................ 2007-249004

(51) Int. Cl.
*B01F 17/00*   (2006.01)
(52) U.S. Cl.
USPC ............ 524/528; 524/232; 524/504; 524/521
(58) Field of Classification Search
USPC .................... 524/232, 504, 521, 528
See application file for complete search history.

(56) References Cited

U.S. PATENT DOCUMENTS

| | | | |
|---|---|---|---|
| 5,484,824 A | 1/1996 | Abe et al. | |
| 6,403,692 B1 | 6/2002 | Traugott et al. | |
| 7,439,296 B2 | 10/2008 | Kanzaki | |
| 7,754,815 B2 | 7/2010 | Toyoda et al. | |
| 8,034,858 B2 | 10/2011 | Watanabe | |
| 2004/0044107 A1 | 3/2004 | Kikuchi et al. | |

FOREIGN PATENT DOCUMENTS

| | | |
|---|---|---|
| EP | 0 601 559 A1 | 6/1994 |
| EP | 1 160 281 A1 | 12/2001 |
| EP | 1 580 230 A2 | 9/2005 |
| JP | 6-32951 | 2/1994 |
| JP | 10-306195 | 11/1998 |
| JP | 10-330559 | 12/1998 |
| JP | 2002-003692 | 1/2002 |
| JP | 2006-083251 | 3/2006 |
| JP | 2006-111864 | 4/2006 |
| JP | 2006-193643 | 7/2006 |
| JP | 2006-282992 | 10/2006 |
| JP | 2006-307015 | 11/2006 |
| JP | 2006-316103 | 11/2006 |
| JP | 2007-161816 | 6/2007 |
| JP | 2007-326978 | 12/2007 |
| WO | WO 2006/003127 A1 | 1/2006 |
| WO | WO 2006/131455 A1 | 12/2006 |
| WO | WO 2007/039421 A1 | 4/2007 |

OTHER PUBLICATIONS

International Search Report recieved in corresponding International Application No. PCT/US2008/077453.
Office Action Japanese Application No. 2010-523205 dated Dec. 4, 2012.
Office Action Japanese Patent Application No. 2010-523205 dated Aug. 20, 2013.

*Primary Examiner* — Peter D Mulcahy
(74) *Attorney, Agent, or Firm* — Foley & Lardner LLP

(57) ABSTRACT

Polypropylene resin compositions are suited for injection molding and are capable of giving molded articles having excellent mechanical properties, reduced tendency to cause flow marks or weld marks, low gloss, and superior scratch resistance. A polypropylene resin composition includes: an amount of a resin composition (F) including a polypropylene (A), an ethylene-α-olefin copolymer or an ethylene-α-olefin-diene copolymer (B-I) having MFR of less than 0.4 g/10 min, an ethylene-α-olefin copolymer (B-2) having MFR of 0.5 to less than 20 g/10 min, and an inorganic filler (C); and specific amounts relative to the resin composition (F) of a modified polypropylene (D) and a surface modifier (E).

16 Claims, No Drawings

POLYPROPYLENE RESIN COMPOSITION

FIELD OF THE INVENTION

The present invention relates to polypropylene resin compositions that are capable of giving molded articles having excellent mechanical properties, unnoticeable flow marks or weld marks, low gloss, and superior scratch resistance.

BACKGROUND ART

Injection molded articles of polypropylene resin compositions find application in various fields including automobile parts and household appliance parts because of their excellent mechanical properties, moldability and economic efficiency. Materials used in the field of automobile parts include polypropylene; polypropylene-based materials that have improved impact resistance by the addition of rubber components such as ethylene-propylene copolymer (EPR), ethylene-butene copolymer (EBR), ethylene-octene copolymer (EOR), styrene-butadiene copolymer (SBR) and polystyrene-ethylene/butene-polystyrene triblock copolymer (SEBS) (Patent Documents 1 and 2); polypropylene materials that have improved rigidity by the addition of inorganic fillers such as talc, mica and glass fibers; and blend polymers that have high mechanical properties by the addition of rubber components and inorganic fillers. Studies are well underway to remedy flow marks (circular ripples) and weld marks, and consequently the proportion of polypropylene in the automobile parts has increased.

On the other hand, polypropylene molded articles are generally poor in scratch resistance and have a glossy appearance. Thus, they are frequently subjected to post treatments such as painting or skin application to improve design properties, and the excellent economic efficiency of the molded articles is not fully enjoyed. Advances in technology to remedy flow marks and weld marks have partially realized the elimination of post treatments for automobile interior parts. However, the low scratch resistance and high gloss have hindered the elimination of post treatments for parts that require particularly high design properties such as interior panels and console boxes.

[Patent Document 1] JP-A-2006-307015
[Patent Document 2] JP-A-2006-316103

DISCLOSURE OF THE INVENTION

It is an object of the present invention to provide polypropylene resin compositions that are suited for injection molding and are capable of giving molded articles having excellent mechanical properties, reduced tendency to cause flow marks or weld marks, low gloss, and superior scratch resistance.

A polypropylene resin composition according to the present invention comprises:

100 parts by weight of a resin composition (F) comprising:
  50 to 75% by weight of a polypropylene (A) having a melt flow rate (ASTM D1238, 230° C., 2.16 kg load) of 20 to 300 g/10 min;
  5 to 15% by weight of an ethylene-α-olefin copolymer or an ethylene-α-olefin-diene copolymer (B-1) having a melt flow rate (ASTM D1238, 230° C., 2.16 kg load) of less than 0.4 g/10 min;
  5 to 15% by weight of an ethylene-α-olefin copolymer (B-2) having a melt flow rate (ASTM D1238, 230° C., 2.16 kg load) of 0.5 to less than 20 g/10 min; and
  15 to 30% by weight of an inorganic filler (C) (the total of (A), (B-1), (B-2) and (C) is 100% by weight);

0.1 to 5.0 parts by weight of a modified polypropylene (D); and
0.1 to 1.0 parts by weight of a surface modifier (E).

In the polypropylene resin composition, the polypropylene (A) is preferably a propylene-ethylene block copolymer, and is particularly preferably a propylene-ethylene block copolymer containing 5 to 15% by weight of a portion soluble in n-decane at 23° C.

In the polypropylene resin composition, it is preferable that: a portion in the component (B-1) that is soluble in n-decane at 23° C. has an intrinsic viscosity $[\eta]$ of 2.0 to 2.4 dl/g; a portion in the component (B-2) that is soluble in n-decane at 23° C. has an intrinsic viscosity $[\eta]$ of 1.0 to 2.0 dl/g; the total of the components (B-1) and (B-2) is 19 to 25% by weight of the resin composition (F); and the component (B-1) accounts for 40 to 60% by weight of the total of the components (B-1) and (B-2).

In the polypropylene resin composition, the inorganic filler (C) is preferably talc having an average particle diameter of 1 to 15 μm.

In the polypropylene resin composition, the modified polypropylene (D) is preferably a fatty acid anhydride-modified polypropylene.

In the polypropylene resin composition, the surface modifier (E) is preferably a fatty acid amide.

ADVANTAGES OF THE INVENTION

The polypropylene resin compositions according to the present invention are suited for injection molding and are capable of giving molded articles having excellent mechanical properties, reduced tendency to cause flow marks or weld marks, low gloss, and superior scratch resistance. The polypropylene resin compositions are suitably used in applications such as automobile interior parts that require particularly high design properties.

BEST MODE FOR CARRYING OUT THE INVENTION

The present invention will be described hereinbelow.

A polypropylene resin composition according to the present invention is obtained by blending a resin composition (F) that includes the following components (A), (B-1), (B-2) and (C), with a modified polypropylene (D) and a surface modifier (E).

(A) Polypropylene

The polypropylene (A) has a melt flow rate of 20 to 300 g/10 min, and preferably 50 to 250 g/10 min.

The melt flow rate (MFR) in the invention is determined at 230° C. under 2.16 kg load in accordance with ASTM D1238.

The polypropylene (A) may be a propylene homopolymer or a copolymer of propylene and a copolymerizable monomer. Preferably, the polypropylene is a propylene-ethylene block copolymer that contains 5 to 15% by weight, and more preferably 7 to 13% by weight of a portion soluble in n-decane at 23° C. (B-1) Ethylene-α-olefin copolymer or ethylene-α-olefin-diene copolymer The ethylene-α-olefin copolymer or ethylene-α-olefin-diene copolymer (B-1) has a melt flow rate of less than 0.4 g/10 min, and preferably 0.05 to 0.35 g/10 min. This component (B-1) preferably has a GPC weight-average molecular weight (Mw) of $2.0 \times 10^5$ to $5.0 \times 10^5$, and more preferably $2.3 \times 10^5$ to $3.0 \times 10^5$. If the weight-average molecular weight of the component (B-1) is less than $2.0 \times 10^5$, the obtainable molded articles may have high surface gloss. If the weight-average molecular weight exceeds $5.0 \times 10^5$, the molded articles may have low impact resistance.

The α-olefins for the ethylene-α-olefin copolymers or ethylene-α-olefin-diene copolymers (B-1) include α-olefins having 3 to 10 carbon atoms, with propylene, 1-butene, 1-hexene and 1-octene being preferable. The dienes for the ethylene-α-olefin-diene copolymers (B-1) include cyclic non-conjugated dienes such as 5-ethylidene-2-norbornene, 5-propylidene-2-norbornene, dicyclopentadiene, 5-vinyl-2-norbornene, 5-methylene-2-norbornene, 5-isopropylidene-2-norbornene and norbornadiene; and chain conjugated dienes such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene and 7-methyl-1,6-octadiene. Of these, 1,4-hexadiene, dicyclopentadiene and 5-ethylidene-2-norbornene are preferred.

It is preferable that a portion in the component (B-1) that is soluble in n-decane at 23° C. has an intrinsic viscosity [η] of 2.0 to 2.4 dl/g.

(B-2) Ethylene-α-olefin Copolymer

The ethylene-α-olefin copolymer (B-2) has a melt flow rate of 0.5 to less than 20 g/10 min, and preferably 1.5 to 10 g/10 min.

Examples of the ethylene-α-olefin copolymers (B-2) include copolymers of ethylene and α-olefins of 3 to 10 carbon atoms. Preferred α-olefins include propylene, 1-butene, 1-hexene and 1-octene.

The component (B-2) preferably has a GPC weight-average molecular weight (Mw) of $0.5 \times 10^5$ to $2.0 \times 10^5$, and more preferably $1.0 \times 10^5$ to $1.8 \times 10^5$. This weight-average molecular weight ensures that the obtainable composition has good balance in mechanical properties.

It is preferable that a portion in the component (B-2) that is soluble in n-decane at 23° C. has an intrinsic viscosity [η] of 1.0 to 2.0 dl/g.

(C) Inorganic Filler

The inorganic filler (C) may be a known inorganic filler without limitation. Examples include talc, mica, calcium carbonate, barium sulfate, glass fibers, gypsum, magnesium carbonate, magnesium oxide, titanium oxide, iron oxide, and metal powders or fibers such as of zinc, copper, iron and aluminum. These fillers may be used singly, or two or more kinds may be used in combination. Of these, talc, mica, calcium carbonate and glass fibers are preferred, and talc is particularly preferred. Suitable talc has an average particle diameter of 1 to 15 μm, and preferably 1 to 6 μm.

(F) Resin Composition

The resin composition (F) includes the components (A), (B-1), (B-2) and (C) described above. The amounts of the components based on 100% by weight of the total of the components (A), (B-1), (B-2) and (C) are: 50 to 75% by weight of the component (A); 5 to 15% by weight of the component (B-1); 5 to 15% by weight of the component (B-2); and 15 to 30% by weight of the component (C). The component (A) preferably accounts for 50 to 69% by weight of the resin composition (F).

The components (B) that are a combination of the component (B-1) and the component (B-2) account for 10 to 30% by weight, preferably 16 to 30% by weight, and more preferably 19 to 25% by weight of 100% by weight of the resin composition (F).

In the resin composition (F), the amount of the component (B-1) relative to the total (100% by weight) of the components (B-1) and (B-2) is generally 25 to 75% by weight, preferably 40 to 60% by weight, and more preferably 40 to 55% by weight.

(D) Modified Polypropylene

The polypropylene resin composition contains a modified polypropylene (D) in an amount of 0.1 to 5.0 parts by weight, preferably 0.1 to 2.0 parts by weight, and more preferably 0.1 to 1.5 parts by weight based on 100 parts by weight of the resin composition (F). In the polypropylene resin composition, the modified polypropylene (D) functions as a scratch resistance improver.

Preferable modified polypropylenes (D) include fatty acid anhydride-modified polypropylenes, and maleic anhydride-modified polypropylene is particularly preferred. When maleic anhydride-modified polypropylene is used as the modified polypropylene (D), the content of the maleic acid modifying groups (M value) based on 100 parts by weight of the polypropylene resin composition is preferably in the range of 0.5 to 5.0, and more preferably 0.8 to 2.5. If the M value is less than the above range, scratch resistance may not be improved. If the M value exceeds the above range, impact strength may be deteriorated.

Examples of the maleic anhydride-modified polypropylenes include commercially available materials such as ADMER manufactured by Mitsui Chemicals Inc., UMEX manufactured by Sanyo Chemical Industries, Ltd., MZ series manufactured by Du Pont Kabushiki kaisha, and Exxelor manufactured by Exxon.

(E) Surface Modifier

The polypropylene resin composition contains a surface modifier (E) in an amount of 0.1 to 1.5 parts by weight, preferably 0.2 to 1.3 parts by weight, and more preferably 0.3 to 1.0 parts by weight based on 100 parts by weight of the resin composition (F).

The surface modifier (E) may be suitably a known antistatic agent. Typical examples are fatty acid amides and monoglycerides. Specific examples of the fatty acid amides include oleamide, stearamide, erucamide, behenamide, palmitamide, myristamide, lauramide, caprylamide, capramide, n-oleyl palmitamide, n-oleyl erucamide and dimers of these amides. Of these, oleamide, stearamide, erucamide and erucamide dimer are preferred. They may be used singly, or two or more kinds may be used in combination.

Other Additives

The polypropylene resin compositions of the invention may contain additives such as heat stabilizers, antistatic agents, weathering stabilizers, light stabilizers, anti-aging agents, antioxidants, fatty acid metal salts, softeners, dispersants, fillers, colorants, lubricants and pigments, while still achieving the object of the invention. The additives may be added in any order. They may be added all at once, or they may be added in several stages where some additives are added in each stage.

Polypropylene Resin Composition

The polypropylene resin composition according to the present invention may be obtained by blending the resin composition (F) that includes the components (A), (B-1), (B-2) and (C), with the components (D) and (E) and optionally the additives. The components may be added in any order.

The polypropylene resin composition may be obtained by mixing or melt kneading the components (A), (B-1), (B-2), (C), (D) and (E) and optionally the additives by means of a mixer such as a Bunbury mixer, a single-screw extruder, a twin-screw extruder or a high speed twin-screw extruder.

The polypropylene resin composition is particularly suited for injection molding. Injection molded articles of the polypropylene resin composition of the invention possess excellent mechanical properties and a beautiful appearance with unnoticeable flow marks or weld marks, and have low gloss and high scratch resistance.

The polypropylene resin compositions of the invention may be suitably used in various fields such as automobile interior and exterior parts and household appliance parts.

EXAMPLES

The present invention will be described in greater detail based on examples without limiting the scope of the invention.

Properties were measured or evaluated in the following manners.

[Melt Flow Rate (g/10 min)]

The melt flow rate (hereinafter MFR) was determined at 230° C. under 2.16 kg load in accordance with ASTM D1238.

[N-decane Soluble Content]

A polymer sample weighing approximately 5 g (the accurate weight was defined as "a"), 200 ml of n-decane and BHT (3,5-di-t-butyl-4-hydroxytoluene) in an amount of approximately 1% relative to the sample amount were placed in a conical flask. They were heated to 145° C. and stirred for 1 hour to give a solution. When the sample was confirmed to be completely dissolved, the solution was allowed to cool for 1 hour. Thereafter, the polymer was precipitated while stirring the solution with a magnetic stirrer for 1 hour. The polymer was subjected to suction filtration with a suction flask and a funnel (325 mesh screen). The filtrate was combined with acetone to a total volume of approximately 1 liter, and the mixture was stirred for 1 hour to precipitate a portion that had been dissolved in n-decane. When the mixture did not become transparent, additional acetone was added and stirring was continued. The portion precipitated was filtered with a suction flask and a funnel (325 mesh screen). The portion precipitated was dried at 105° C. and a reduced pressure of not more than 20 mm Hg for 1 hour. The weight of the n-decane soluble portion that was dried was defined as "b". The n-decane soluble content was calculated by the following formula:

$$n\text{-decane soluble content }(\%) = (b/a) \times 100$$

a: weight (g) of the polymer sample
b: weight (g) of the n-decane soluble portion that was recovered

[Intrinsic viscosity [$\eta$]]

A sample weighing approximately 20 mg was dissolved in 15 ml of decalin, and the specific viscosity $\eta sp$ was measured in an oil bath at 135° C. The decalin solution was diluted with 5 ml of decalin, and the specific viscosity $\eta sp$ was determined in the same manner. The dilution was repeated two more times. The value of $\eta sp/C$ when the concentration (C) was extrapolated to zero concentration was obtained as an intrinsic viscosity.

$$[\eta] = \lim(\eta sp/C)(C \to 0)$$

[Flexural Modulus (MPa)]

The flexural modulus was determined at a bending rate of 2 mm/min with a span of 100 mm in accordance with ASTM D790.

[Izod Impact Strength at Normal Temperature (J/m)]

A notched sample was tested at a hammer energy of 40 kg·cm in accordance with ASTM D256.

[Gloss of Mirror Finished Surface]

A plate was molded to a size of 130 mm×120 mm×2 mm at a molding temperature of 210° C. and a mold temperature of 40° C., and the surface was mirror finished. The gloss of the mirror finished surface was determined at a light source illumination angle of 60° using a gloss meter (NDH-300 manufactured by NIPPON DENSHOKU INDUSTRIES CO., LTD.).

[Scratch Resistance 1]

A plate was molded to a size of 130 mm×120 mm×2 mm at a molding temperature of 210° C. and a mold temperature of 40° C., and the surface was grained with Grain C. The grained plate was subjected to Ford five finger test (unit: N), and the maximum load (N) at which no visible whitening occurred was determined.

[Scratch Resistance 2]

A plate was molded to a size of 130 mm×120 mm×2 mm at a molding temperature of 210° C. and a mold temperature of 40° C., and the surface was grained with Grain C. The surface of the grained plate was scratched with a tungsten needle under a load of 35 g. The color difference ($\Delta E$) between the scratch and the non-scratched surface was determined.

The following components were used in Examples and Comparative Examples.

(A) Polypropylenes
(BPP-1) Propylene block copolymer
MFR=53 g/10 min
Weight of 23° C. n-decane soluble portion=12% by weight
Ethylene content in 23° C. n-decane soluble portion=37 mol %
[$\eta$] of 23° C. n-decane soluble portion=7 dl/g
(BPP-2) Propylene block copolymer
MFR=100 g/10 min
Weight of 23° C. n-decane soluble portion=7% by weight
Ethylene content in 23° C. n-decane soluble portion=37 mol %
[$\eta$] of 23° C. n-decane soluble portion=7 dl/g
(BPP-3) Propylene block copolymer
MFR=35 g/10 min
Weight of 23° C. n-decane soluble portion=7% by weight
Ethylene content in 23° C. n-decane soluble portion=37 mol %
[$\eta$] of 23° C. n-decane soluble portion=7 dl/g
(BPP-4) Propylene block copolymer
MFR=15 g/10 min
Weight of 23° C. n-decane soluble portion=7% by weight
Ethylene content in 23° C. n-decane soluble portion=37 mol %
[$\eta$] of 23° C. n-decane soluble portion=7 dl/g
(BPP-5) Propylene block copolymer
MFR=30 g/10 min
Weight of 23° C. n-decane soluble portion=24% by weight
Ethylene content in 23° C. n-decane soluble portion=40 mol %
[$\eta$] of 23° C. n-decane soluble portion=2.5 dl/g
(HPP-1) Propylene homopolymer
MFR=3 g/10 min
(HPP-2) Propylene homopolymer
MFR=100 g/10 min
(B) Ethylene-α-olefin copolymers
<B-1>
(R-1) Ethylene-propylene-diene random copolymer (EP57P manufactured by JSR Corporation)
MFR=0.2 g/10 min
[$\eta$]=2.4 dl/g
(R-7) Ethylene-propylene-diene random copolymer (KEP570 manufactured by KUMHO)
MFR=0.2 g/10 min=
[$\eta$]=2.4 dl/g
(R-8) Ethylene-propylene-diene random copolymer (IP4760P manufactured by Dow Chemical)
MFR=0.2 g/10 min
[$\eta$]=2.4 dl/g <B-2>
(R-2) Ethylene-butene random copolymer (A4050 manufactured by Mitsui Chemicals, Inc.)
MFR=7 g/10 min
[η]=1.4 dl/g
(R-3) Ethylene-octene random copolymer (EG8100 manufactured by DuPont Dow Elastomers)
MFR=2 g/10 min
[η]=1.8 dl/g
(R-4) Ethylene-octene random copolymer (EG8150 manufactured by DuPont Dow Elastomers)
MFR=1 g/10 min
[η]=2.0 dl/g
(R-5) Ethylene-butene random copolymer (A0550 manufactured by Mitsui Chemicals, Inc.)
MFR=0.9 g/10 min
[η]=2.2 dl/g
(R-6) Ethylene-octene random copolymer (EG8200 manufactured by DuPont Dow Elastomers)
MFR=10.6 g/10 min
[η]=1.3 dl/g
(C) Inorganic filler
Talc (5000PJ manufactured by Matsumura Sangyo K.K.)
Average particle diameter: 4 μm
(D) Modified polypropylenes
(MPP-1) Maleic anhydride-modified polypropylene (UMEX 1010 manufactured by Sanyo Chemical Industries, Ltd.)
M value=4.5
(MPP-2) Maleic anhydride-modified polypropylene (MZ203D manufactured by DuPont Canada)
M value=1.6
(MPP-3) Maleic anhydride-modified polypropylene (Exxelor 1020 manufactured by Exxon)
M value=3
(E) Surface modifier
Erucamide (NEUTRON S manufactured by Nippon Fine Chemical) Additives
Petroleum resin+EVA mixture (TR060 manufactured by STRUTOL)

Examples 1 to 9 and Comparative Examples 1 to 9

The components in amounts (parts by weight) shown in Tables 1 to 4;
0.1 parts by weight of IRGANOX 1010 (manufactured by Ciba Specialty Chemicals) as an antioxidant;
0.1 parts by weight of IRGAFOS 168 (manufactured by Ciba Specialty Chemicals) as an antioxidant;
0.2 parts by weight of LA-52 (manufactured by ADEKA CORPORATION) as a light stabilizer;
0.1 parts by weight of calcium stearate (NOF CORPORATION) as a lubricant; and
3 parts by weight of MB PPCM 802Y-307 (manufactured by TOKYO PRINTING INK MFG. CO., LTD.) as a pigment were dry blended with a Henschel mixer. The blend was extruded with a twin-screw extruder (TEX 30α manufactured by The Japan Steel Works, Ltd.) at a barrel temperature of 200° C., a screw rotation of 600 rpm and an output of 50 kg/h to give a polypropylene resin composition. The composition was injection molded at a molding temperature of 210° C. and a mold temperature of 40° C. to give test pieces for flexural modulus test and Izod impact strength test. Separately, plates were molded at a molding temperature of 220° C. and a mold temperature of 40° C. The test pieces and the plates were tested to evaluate resin properties and appearance properties of molded articles, respectively. The results are set forth in Tables 1 to 3, wherein the scratch resistance integrated evaluation is the result in consideration of the scratch resistance 1 and scratch resistance 2.

TABLE 1

| | | | Ex. 1 | Ex. 2 | Comp. Ex. 1 | Comp. Ex. 2 | Comp. Ex. 3 |
|---|---|---|---|---|---|---|---|
| Composition of polypropylene resin composition (parts by weight) | (A) Polypropylene | | BPP-1 (61) | BPP-2 (53.75) | BPP-5 (72) HPP-1 (4) | BPP-2 (42) HPP-2 (15) | BPP-3 (47) BPP-4 (15) |
| | (B) Rubbers | Component (B-1) | R-1 (9.4) | R-1 (10) | — | — | — |
| | | Component (B-2) | R-3 (9.6) | R-3 (14.75) | R-2 (4) | R-3 (15) R-6 (7) | R-4 (15) |
| | (C) Inorganic filler | | Talc (20) | Talc (21.5) | Talc (20) | Talc (19) | Talc (23) |
| | (D) Modified polypropylene | | MPP-1 (0.4) | MPP-2 (0.5) | — | MPP-2 (1.3) | MPP-3 (0.6) |
| | (E) Surface modifier | | Erucamide (0.55) | Erucamide (0.5) | — | Erucamide (0.5) | Erucamide (0.3) |
| | Additives | | — | — | — | — | Petroleum resin + EVA (0.25) |
| Properties | Flexural modulus (MPa) | | 2200 | 2050 | 2280 | 2030 | 2350 |
| | Izod impact strength at normal temperature (J/m) | | 220 | 250 | 195 | 185 | 230 |
| Appearance properties | Mirror finished surface gloss | | 40 | 46 | 60 | 60 | 51 |
| | Scratch resistance 1 | | 13 | 13 | 2 | 13 | 15 |
| | Scratch resistance 2 | | 0.8 | 1.0 | 2.0 | 1.0 | 0.4 |
| | Scratch resistance integrated evaluation | | Good | Good | Bad | Good | Good |

TABLE 2

| | | Ex. 1 | Ex. 3 | Ex. 4 | Ex. 5 | Ex. 6 | Ex. 7 | Comp. Ex. 4 | Comp. Ex. 5 | Comp. Ex. 6 |
|---|---|---|---|---|---|---|---|---|---|---|
| Composition of polypropylene resin composition (parts by weight) | (A) Polypropylene | BPP-1 (61) | BPP-1 (61) | BPP-1 (61) | BPP-1 (61) | BPP-1 (61) | BPP-1 (61) | BPP-1 (61) | BPP-1 (61) | BPP-1 (61) |
| | (B) Rubbers Component (B-1) | R-1 (9.4) | R-7 (9.4) | R-7 (11.4) | R-8 (9.4) | R-7 (12.3) | R-7 (13.3) | R-1 (3.4) | — | R-1 (19) |
| | Component (B-2) | R-3 (9.6) | R-3 (9.6) | R-3 (7.6) | R-3 (9.6) | R-3 (6.7) | R-3 (5.7) | R-3 (15.6) | R-5 (19) | — |
| | (C) Inorganic filler | Talc (20) | Talc (20) | Talc (20) | Talc (20) | Talc (20) | Talc (20) | Talc (20) | Talc (20) | Talc (20) |
| | (D) Modified polypropylene | MPP-1 (0.4) | MPP-1 (0.4) | MPP-1 (0.4) | MPP-1 (0.4) | MPP-1 (0.4) | MPP-1 (0.4) | MPP-1 (0.4) | MPP-1 (0.4) | MPP-1 (0.4) |
| | (E) Surface modifier | Erucamide (0.55) | Erucamide (0.55) | Erucamide (0.55) | Erucamide (0.55) | Erucamide (0.55) | Erucamide (0.55) | Erucamide (0.55) | Erucamide (0.55) | Erucamide (0.55) |
| Properties | Flexural modulus (MPa) | 2200 | 2180 | 2230 | 2150 | 2250 | 2250 | 2100 | 2200 | 2300 |
| | Izod impact strength at normal temperature (J/m) | 220 | 230 | 220 | 220 | 160 | 160 | 240 | 160 | 55 |
| Appearance properties | Mirror finished surface gloss | 40 | 37 | 32 | 35 | 27 | 25 | 56 | 55 | 30 |
| | Scratch resistance 1 | 13 | 10 | 10 | 10 | 10 | 10 | 13 | 10 | 10 |
| | Scratch resistance 2 | 0.8 | 0.7 | 0.8 | 0.8 | 0.7 | 0.7 | 0.95 | 0.95 | 1.0 |
| | Scratch resistance integrated evaluation | Good | Good | Good | Good | Good | Good | Good | Good | Good |

TABLE 3

| | | | Ex. 1 | Ex. 8 | Ex. 9 | Comp. Ex. 7 | Comp. Ex. 8 | Comp. Ex. 9 |
|---|---|---|---|---|---|---|---|---|
| Composition of polypropylene resin composition (parts by weight) | (A) Polypropylene | | BPP-1 (61) | BPP-1 (61) | BPP-1 (61) | BPP-1 (61) | BPP-1 (61) | BPP-1 (61) |
| | (B) Rubbers | Component (B-1) | R-1 (9.4) | R-1 (9.4) | R-1 (9.4) | R-1 (9.4) | R-1 (9.4) | R-1 (9.4) |
| | | Component (B-2) | R-3 (9.6) | R-3 (9.6) | R-3 (9.6) | R-3 (9.6) | R-3 (9.6) | R-3 (9.6) |
| | (C) Inorganic filler | | Talc (20) | Talc (20) | Talc (20) | Talc (20) | Talc (20) | Talc (20) |
| | (D) Modified polypropylene | | MPP-1 (0.4) | MPP-3 (0.3) | MPP-3 (0.6) | MPP-1 (0.4) | — | — |
| | (E) Surface modifier | | Erucamide (0.55) | Erucamide (0.55) | Erucamide (0.55) | — | Erucamide (0.55) | Erucamide (1.0) |
| Appearance properties | Mirror finished surface gloss | | 40 | 41 | 39 | 38 | 39 | 40 |
| | Scratch resistance 1 | | 13 | 10 | 13 | 5 | 7 | 7 |
| | Scratch resistance 2 | | 0.8 | 1.2 | 1.0 | 1.9 | 1.8 | 1.2 |
| | Scratch resistance integrated evaluation | | Good | Good | Good | Bad | Bad | Bad |

The comparison of Examples 1 and 2 with Comparative Examples 1 to 3 (Table 1) shows that the molded articles of the polypropylene resin compositions of the invention achieved improved scratch resistance because of the combined use of the modified polypropylene (D) and the surface modifier (E) that was a fatty acid amide in appropriate amounts. The comparison also shows that the non-use of the component (B-1) resulted in increased gloss of the mirror finished surface.

Comparing Examples 1 and 3 to 7 with Comparative Examples 4 to 6 (Table 2) shows that the molded articles of the polypropylene resin compositions of the invention achieved optimum Izod impact strength at normal temperature and mirror finished surface gloss because of the combined use of the components (B-1) and (B-2) in appropriate amounts with an appropriate ratio.

Examples 1, 8 and 9 compared with Comparative Examples 7 to 9 (Table 3) show that the molded articles of the polypropylene resin compositions of the invention achieved improved scratch resistance because of the combined use of the modified polypropylene (D) and the surface modifier (E) that was a fatty acid amide in appropriate amounts.

INDUSTRIAL APPLICABILITY

The polypropylene resin compositions are suitably used as molding materials in various fields including automobile interior and exterior parts such as interior panels and console boxes and household appliance parts.

The invention claimed is:
1. A polypropylene resin composition comprising:
100 parts by weight of a resin composition (F) comprising:
  50 to 75% by weight of a polypropylene (A) having a melt flow rate (ASTM D1238, 230° C., 2.16 kg load) of 20 to 300 g/10 min;
  5 to 15% by weight of an ethylene-α-olefin copolymer or an ethylene-α-olefin-diene copolymer (B-1) having a melt flow rate (ASTM D1238, 230° C., 2.16 kg load) of less than 0.4 g/10 min;
  5 to 15% by weight of an ethylene-α-olefin copolymer (B-2) having a melt flow rate (ASTM D1238, 230° C., 2.16 kg load) of 0.5 to less than 20 g/10 min; and

15 to 30% by weight of an inorganic filler (C) (the total of (A), (B-1), (B-2) and (C) is 100% by weight);
0.1 to 5.0 parts by weight of a modified polypropylene (D); and
0.1 to 1.0 parts by weight of a surface modifier (E).

2. The polypropylene resin composition according to claim 1, wherein the polypropylene (A) is a propylene-ethylene block copolymer.

3. The polypropylene resin composition according to claim 2, wherein the propylene-ethylene block copolymer contains 5 to 15% by weight of a portion soluble in n-decane at 23° C.

4. The polypropylene resin composition according to claim 1, wherein a portion in the component (B-1) that is soluble in n-decane at 23° C. has an intrinsic viscosity [η] of 2.0 to 2.4 dl/g, and a portion in the component (B-2) that is soluble in n-decane at 23° C. has an intrinsic viscosity [η] of 1.0 to 2.0 dl/g.

5. The polypropylene resin composition according to claim 1, wherein the total of the components (B-1) and (B-2) is 19 to 25% by weight of the resin composition (F).

6. The polypropylene resin composition according to claim 1, wherein the component (B-1) accounts for 40 to 60% by weight of the total of the components (B-1) and (B-2).

7. The polypropylene resin composition according to claim 1, wherein the inorganic filler (C) is talc having an average particle diameter of 1 to 15 μm.

8. The polypropylene resin composition according to claim 1, wherein the modified polypropylene (D) is a fatty acid anhydride-modified polypropylene.

9. The polypropylene resin composition according to claim 1, wherein the surface modifier (E) is a fatty acid amide.

10. The polypropylene resin composition according to claim 2, wherein a portion in the component (B-1) that is soluble in n-decane at 23° C. has an intrinsic viscosity [η] of 2.0 to 2.4 dl/g, and a portion in the component (B-2) that is soluble in n-decane at 23° C. has an intrinsic viscosity [η] of 1.0 to 2.0 dl/g.

11. The polypropylene resin composition according to claim 2, wherein the total of the components (B-1) and (B-2) is 19 to 25% by weight of the resin composition (F).

12. The polypropylene resin composition according to claim 2, wherein the component (B-1) accounts for 40 to 60% by weight of the total of the components (B-1) and (B-2).

13. The polypropylene resin composition according to claim 2, wherein the inorganic filler (C) is talc having an average particle diameter of 1 to 15 μm.

14. The polypropylene resin composition according to claim 2, wherein the modified polypropylene (D) is a fatty acid anhydride-modified polypropylene.

15. The polypropylene resin composition according to claim 2, wherein the surface modifier (E) is a fatty acid amide.

16. The polypropylene resin composition according to claim 1, wherein the ethylene-α-olefin copolymer or ethylene-α-olefin-diene copolymer (B-1) has a melt flow rate of 0.05 to 0.35 g/10 min.

\* \* \* \* \*